US012789722B2

(12) United States Patent
Valovick et al.

(10) Patent No.: US 12,789,722 B2
(45) Date of Patent: Nov. 10, 2026

(54) VEHICLE DRIVELINE NOISE SUPPRESSION SYSTEM AND METHOD

(71) Applicant: GM GLOBAL TECHNOLOGY OPERATIONS LLC, Detroit, MI (US)

(72) Inventors: Brian Michael Valovick, Oxford, MI (US); Fabian Clemens, Romeo, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 413 days.

(21) Appl. No.: 18/517,786

(22) Filed: Nov. 22, 2023

(65) Prior Publication Data

US 2025/0162518 A1 May 22, 2025

(51) Int. Cl.
*B60B 27/00* (2006.01)
*B60R 13/08* (2006.01)

(52) U.S. Cl.
CPC .......... *B60R 13/08* (2013.01); *B60B 27/0073* (2013.01)

(58) Field of Classification Search
CPC ....... B60R 13/08; B60B 27/06; B60B 27/065; B60B 27/0073; B60B 35/14; B60B 35/18; B60B 2900/133
USPC .......................................................... 181/184
See application file for complete search history.

(56) References Cited

U.S. PATENT DOCUMENTS 6,286,909 B1 * 9/2001 Mizukoshi ............ F16C 35/073 301/105.1
6,786,645 B2 * 9/2004 Joki ...................... F16C 19/548 384/488
7,125,171 B2 * 10/2006 Ouchi ................. B60B 27/0005 384/537
8,297,631 B2 10/2012 Siebeneick et al.
8,616,779 B2 * 12/2013 Liu ..................... B60B 27/0073 384/544
8,770,672 B2 * 7/2014 Alcantara Burguete ..................... B60B 27/0073 301/105.1
8,893,364 B2 * 11/2014 Rode ....................... B60B 29/00 29/407.05
10,618,350 B2 * 4/2020 Cheng ................... B60B 27/065
2022/0203762 A1 * 6/2022 Sandrasekaran ...... F16B 39/284

FOREIGN PATENT DOCUMENTS

CN 204150022 U * 2/2015
CN 208498141 U * 2/2019
CN 208858741 U * 5/2019
(Continued)

OTHER PUBLICATIONS

Machine translation of CN-204150022-U (Year: 2015).*
(Continued)

*Primary Examiner* — Dedei K Hammond
*Assistant Examiner* — Jennifer B Olson
(74) *Attorney, Agent, or Firm* — Ingrassia Fisher & Lorenz, LLP | IFL

(57) ABSTRACT

A noise suppression system and method for a vehicle that has a driveline with a halfshaft. The halfshaft has a surface. A wheel hub and bearing assembly is coupled with the halfshaft. The wheel hub and bearing assembly includes a wall contacting the surface at an interface. The wall and/or the halfshaft defines a groove. A ring is compressed in the groove between the halfshaft and the wheel hub and bearing assembly.

20 Claims, 4 Drawing Sheets

(56) References Cited

FOREIGN PATENT DOCUMENTS

| | | | | |
|---|---|---|---|---|
| DE | 69828132 | T2 | 12/2005 | |
| DE | 102021130208 | A1 | 7/2022 | |
| DE | 102022110142 | A1 | 1/2023 | |
| WO | WO-2023082791 | A1 * | 5/2023 | ............. B60K 17/22 |

OTHER PUBLICATIONS

Machine translation of CN-208858741-U (Year: 2019).*
Machine translation of WO-2023082791-A1 (Year: 2023).*
Machine translation of CN-208498141-U (Year: 2019).*
General Motors LLC. May 2019. GM Service Bulletin. Intermittent Click Noise at Front of Vehicle, ABS, Traction Control System (TCS)/Stabilitrak Lamps May Illuminate Intermittently and/or Deactivate for Ignition Cycle. Bulletin No. 19-NA-103.

* cited by examiner

VEHICLE DRIVELINE NOISE SUPPRESSION SYSTEM AND METHOD

INTRODUCTION

The present disclosure generally relates to sounds generated by vehicle drivelines and more particularly to systems and methods for suppression and avoidance of sounds that may be generated in the vehicle driveline.

A vehicle driveline includes numerous moving parts that transmit torque from the vehicle's powerplant to its wheels. In many applications, such as those involving electrified vehicles, torque is alternatively transferred from the wheels to the powerplant, such as in regenerative braking situations. In addition, due to the inclusion of a steering system and a suspension system through which the wheels may be coupled with the body of the vehicle, the driveline is designed to accommodate a wide range of angles for the expected relative movements.

In operation, the driveline is subjected to significant forces and torques. As a result, many sounds are generated. After multiple cycles, the components involved may wear, corrode, and otherwise change in ways that influence the sounds that are generated. In certain situations, the generated sounds may be perceived by the vehicle occupant(s) as undesirable noises. For example, squeaks, groans, rattles, clicks and other sounds may be described. Diagnosing the source of these sounds and whether corrective action is needed is challenging. In some situations, changes in the generated sounds over time may be normal. In other situations, addressing the perceived sound may be desirable for customer satisfaction or other purposes.

Accordingly, it is desirable to provide vehicle drivelines that avoid undesirable sounds being perceived by the driver, where possible. Furthermore, other desirable features and characteristics of the present invention will become apparent from the subsequent detailed description and the appended claims, taken in conjunction with the accompanying drawings and the foregoing introduction.

SUMMARY

Noise suppression systems and methods are provided for a vehicle driveline. In a number of embodiments, the vehicle includes a driveline with a halfshaft. The halfshaft has a surface. A wheel hub and bearing assembly is coupled with the halfshaft. The wheel hub and bearing assembly includes a wall contacting the surface at an interface. The wall and/or the halfshaft define(s) a groove. A ring is compressed in the groove between the halfshaft and the wheel hub and bearing assembly.

In additional embodiments, the ring is made of a compliant, resilient material.

In additional embodiments, a gap is defined between the halfshaft and the wheel hub and bearing assembly. The gap is disposed around, and radially outward from, the ring.

In additional embodiments, a fastener is included to secure the wheel hub and bearing assembly to the halfshaft. The fastener is torqued to a selected torque value that optimizes noise suppression.

In additional embodiments, the selected torque value is selected so that the wall contacts the surface and compresses the ring fully into the groove.

In additional embodiments, the fastener is torqued to a selected torque value, wherein the selected torque value is approximately twenty percent to thirty percent of a conventional torque valve.

In additional embodiments, a splined shaft is included on the halfshaft. The ring seals the interface and the splined shaft.

In additional embodiments, the surface of the halfshaft is disposed normal to a centerline of the halfshaft.

In additional embodiments, the wheel hub and bearing assembly includes a hub assembly with a hub body and a bearing assembly disposed around the hub body. The wall is disposed at an inboard end of the hub body where the inboard end is located inboard relative to the vehicle.

In additional embodiments, the ring has a cross sectional shape that tapers in an axial direction.

In a number of other embodiments, a method of noise suppression for a vehicle includes constructing a halfshaft for a driveline of the vehicle, and providing the halfshaft with a surface. A wheel hub and bearing assembly is coupled with the halfshaft. The wheel hub and bearing assembly includes a wall that contacts the surface at an interface. A groove is formed in at least one of the wall and the halfshaft. A ring is compressed in the groove between the halfshaft and the wheel hub and bearing assembly.

In additional embodiments, a method includes forming the ring from a compliant, resilient material.

In additional embodiments, a method includes defining a gap between the halfshaft and the wheel hub and bearing assembly so that the gap is disposed around, and radially outward from, the ring.

In additional embodiments, a method includes securing, by a fastener, the wheel hub and bearing assembly to the halfshaft; and torquing the fastener to a selected torque value that optimizes noise suppression.

In additional embodiments, a method includes selecting the selected torque value so that the wall contacts the surface and compresses the ring fully into the groove.

In additional embodiments, a method includes torquing the fastener to a selected torque value that is approximately twenty percent to thirty percent of a conventional torque valve to optimize the noise suppression.

In additional embodiments, a method includes forming a splined shaft on the halfshaft; and sealing, by the ring, the interface and the splined shaft.

In additional embodiments, a method includes forming the surface of the halfshaft to be disposed normal to a centerline of the halfshaft.

In additional embodiments, a method includes having, in the wheel hub and bearing assembly, a hub assembly with a hub body and a bearing assembly disposed around the hub body. The wall is formed at an inboard end of the hub body where the inboard end is located inboard relative to the vehicle.

In a number of additional embodiments, a noise suppression system is provided for a vehicle that includes a driveline with a halfshaft that includes a surface defining an annular shape around the halfshaft. A wheel hub and bearing assembly is coupled with the halfshaft. The wheel hub and bearing assembly includes a hub body that has a wall contacting the surface at an interface. The wall and/or the surface defines a groove. A fastener retains the wheel hub and bearing assembly to the halfshaft. A compliant ring is compressed, by a torquing of the fastener, in the groove between the halfshaft and the wheel hub and bearing assembly.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description.

Figure 1:
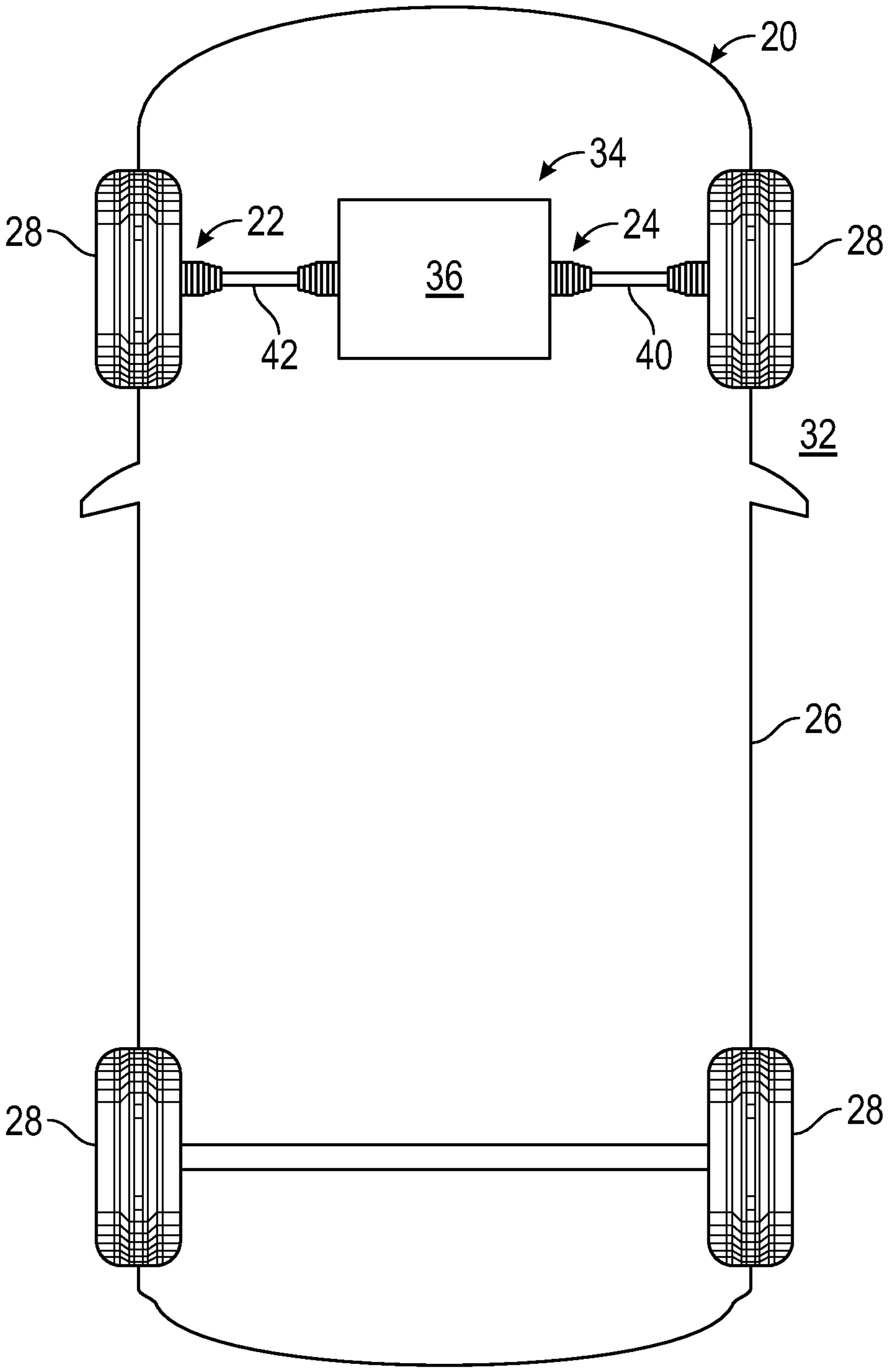
FIG. 1 is a schematic diagram of a vehicle, in accordance with various embodiments.

With reference to FIG. 1, illustrated is one example of a vehicle 20 with a noise suppression system 22 in its driveline 24. As depicted in FIG. 1, the vehicle 20 generally includes a structure including a body 26, supported on wheel assemblies 28, such as by a suspension assembly (shown in FIG. 3). The body 26 may be of various types that define a physical shape for desired purposes. The body 26 substantially encloses components of the vehicle 20, and the wheel assemblies 28 are each rotationally coupled near a respective corner of the body 26. In various embodiments, the vehicle 20 may be a front wheel drive vehicle as shown, a rear wheel drive vehicle, or an all-wheel drive vehicle, in each case with any number of wheels. In additional embodiments, other drive arrangements are contemplated.

Propulsion of the vehicle 20, such as on a roadway 32, is provided by a propulsion system 34 including a powerplant 36. The powerplant 36 may be any of various types such as electric, internal combustion, hybrid, or others. Torque generated by the powerplant 36 is transferred to the wheel assemblies 28 through the driveline 24. The driveline 24 includes a number of torque transfer elements that may be coupled with any number of the wheel assemblies 28. In this embodiment, the powerplant 36 is coupled with the front wheel assemblies 28 through a pair of halfshafts 40 and 42 of the driveline 24.

The vehicle 20 is propelled by transferring torque from the powerplant 36 through the driveline 24 and uses forces generated as a result of traction due to friction between the wheel assemblies 28 and a roadway 32. In embodiments, the wheel assemblies 28 may also operate to transfer torque to the powerplant 36. For example, in a regenerative braking mode the momentum of the vehicle 20 may be used to drive the powerplant 36 by the wheel assemblies 28 and through the driveline 24. As a result, torque may act bi-directionally on the various component interfaces of the driveline 24.

Figure 2:
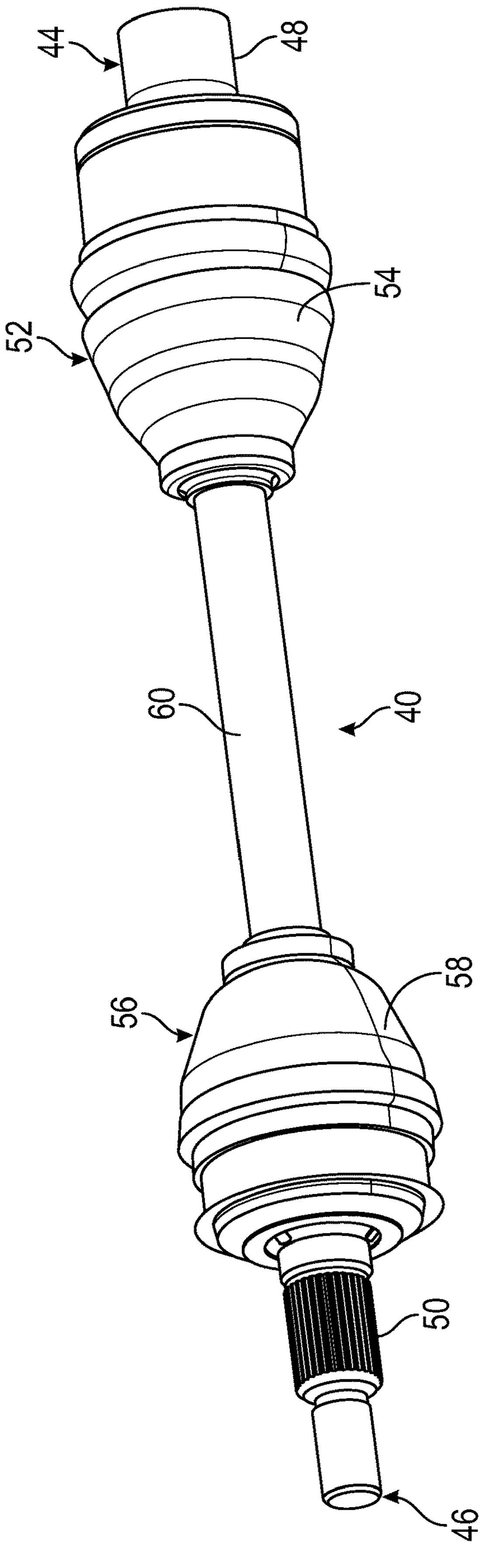
FIG. 2 is a perspective illustration of one half-shaft of the driveline of the vehicle of FIG. 1, in accordance with various embodiments.

Referring additionally to FIG. 2 with continued reference to FIG. 1, one halfshaft 40 is illustrated in isolation. It will be understood that the other halfshaft 42 is similar to, or the same as, the halfshaft 40. The halfshaft 40 includes an inboard end 44 configured for coupling, directly or indirectly, with the powerplant 36, and an outboard end 46 configured for coupling, directly or indirectly, with a wheel assembly 28. For example, as coupling mechanisms, the inboard end 44 includes a collar 48 and the outboard end 46 includes a splined shaft 50. In other embodiments, different types of coupling mechanisms may be used.

The halfshaft 40 is configured, while rotating, to allow the outboard end 46 to pivot at various angles relative to the inboard end 44, such as to accommodate suspension travel and steering angles. Adjacent to the outboard end 46, or nearer to the inboard end 44 than the inboard end 44, the halfshaft 40 includes a joint assembly 52, such as a tripod joint, covered by a boot 54. Adjacent to, or relatively nearer to, the outboard end 46, the halfshaft 40 includes a joint assembly 56, such as a constant velocity joint, covered by a boot 58. The halfshaft 40 includes a shaft 60 interconnecting the joint assemblies 52, 56. As a result, torque is transferable between the inboard end 44 and the outboard end 46 and suspension and steering travels are accommodated.

Figure 3:
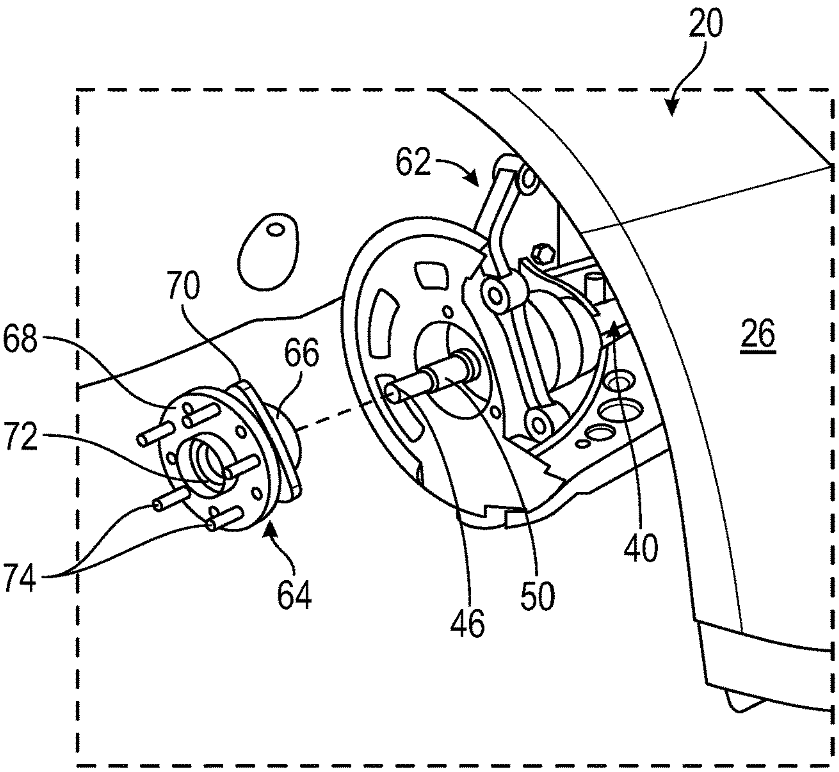
FIG. 3 is a fragmentary, partially exploded, perspective illustration of the front right area of the vehicle of FIG. 1, in accordance with various embodiments.

Referring to FIG. 3, a view of the area around the outboard end 46 of the halfshaft 40 illustrates select aspects of the right front corner of the vehicle 20. The halfshaft 40 extends through a steerable suspension assembly 62 with its splined shaft 50 exposed. Shown removed from the splined shaft 50 is a wheel hub and bearing assembly 64. The wheel hub and bearing assembly 64 includes a bearing assembly 66 and a connected hub assembly 68. The wheel hub and bearing assembly 64 includes a flange 70 for connecting with the suspension assembly 62 and presents a rotatable splined opening 72 for receiving the splined shaft 50. The hub assembly 68 includes studs 74 for connecting with the wheel assembly 28. The wheel hub and bearing assembly 64 is configured so that with the flange 70 rotatably fixed to the suspension assembly 62, the hub assembly 68 is rotatable by the engaged halfshaft 40.

Figure 4:
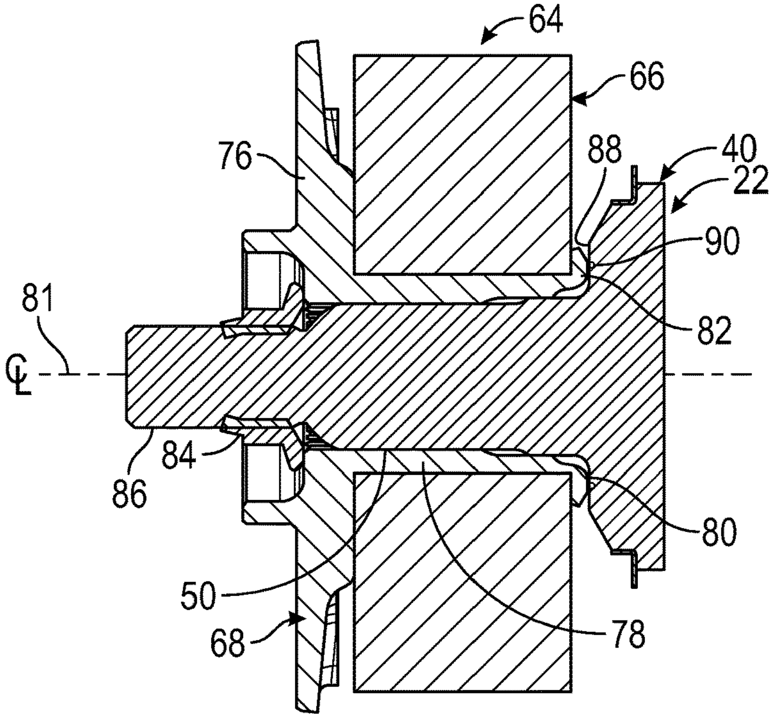
FIG. 4 is a sectional, fragmentary, schematic illustration of the halfshaft to the wheel bearing and hub assembly interface area of the vehicle of FIG. 1, in accordance with various embodiments.

Referring to FIG. 4, the interface area between the halfshaft 40 and the wheel hub and bearing assembly 64 is shown schematically. The hub assembly 68 includes a flange 76 for coupling with the wheel assembly 28 (with the studs 74 omitted in this view). The hub assembly 68 includes a hub body 78 integral with the flange 76 that is tubular and that extends through the bearing assembly 66. The shaft 50 of the halfshaft 40 defines an axis 81, which is substantially along its centerline. An axial direction is along or parallel to the axis 81. The hub body 78 defines the splined opening 72 which receives the splined shaft 50 of the halfshaft 40 along the axis 81.

The bearing assembly 66 is shown schematically and in general, includes an outer race configured, such as through the flange 70 of FIG. 3, to couple with the suspension system 62 and a rotatable inner race that supports the hub assembly 68 and the halfshaft 40. An example bearing assembly is disclosed in U.S. Pat. No. 8,297,631B2 which is commonly assigned, and which is specifically incorporated herein by reference. The inner (inboard) end 80 of the hub body 78 is formed over the bearing assembly 66, such as by rolling, forming a wall 82 that projects radially outward from the hub body 78 and that is annular in shape. Forming of the wall 82 secures the bearing assembly 66 and the hub assembly 68 together in the wheel hub and bearing assembly 64. The wheel hub and bearing assembly 64 is secured to the halfshaft 40 by a fastener or fasteners, such as a nut 84 threaded onto a threaded section 86 projecting from the splined shaft 50 at the outboard end 46 of the halfshaft 40. When torqued, the nut 84 forces the wall 82 against a surface

88 of the halfshaft 40. In the current embodiment, the surface 88 faces laterally outward relative to the vehicle 20 and extends radially outward along the wall 82. In the current embodiment, the surface 88 is disposed in a plane that is normal to the centerline of the halfshaft 40 and defines an annular shape around the halfshaft 40 facing toward the outboard end 46. In various embodiments, the surface 88 may act as, and may be referred to as an interface surface or a contact surface with the wheel hub and bearing assembly 64, or with the hub assembly 68, or with the bearing assembly 66.

Various interfaces with the halfshaft 40 exist. For example, one interface 77 is a splined connection between the splined shaft 50 and the hub body 78. Another interface is between the nut 84 and the threaded section 86. Another interface is between the nut 84 and the hub assembly 68. Another interface 79 is between the wall 82 and the halfshaft 40 at the surface 88. Various other interfaces may exist.

Regarding the interfaces, those between the nut 84 and other components are generally not of concern for noise generation because the nut 84 is typically secured in position on the threaded section 86 by a pin, such as a cotter pin (not shown), by a clip (not shown), or by other means.

As part of the current disclosure, the interface between the wall 82 and the halfshaft 40 at the surface 88 has been found to be the source of sounds that may be considered noise or that may develop into a noise over time. Due to intermittent and variable torque transfers including in both propulsion modes and regenerative braking modes, which may be described as fatigue cycles, the surface 88 and/or the wall 82 may wear over time or may experience a changed clamp load. In addition, the wall 82 and/or the surface 88 at the interface may be subject to corrosion. As a result, sounds that may be described as a click may develop.

Also as part of the current disclosure, the interface between the hub body 78 and the splined shaft 50 of the halfshaft 40 has been found to be the source of sounds that may be considered noise or that may develop into a noise over time. This interface is also subjected to intermittent and variable torque transfers including in both propulsion modes and regenerative braking modes, which may be described as fatigue cycles. Oxidation/corrosion of the spline surfaces in the interface may occur, oxides may wear off, and new corrosion may occur in a repetitive fashion. As a result, outcomes such as fretting may occur that may lead to changes in the sounds generated and that may become classified as noise.

In general, the noise suppression system 22 may include various aspects including of a resilient element in the form of a ring 90 and including of the nut 84 as further described below. In embodiments, the ring 90 may be referred to as a noise suppression ring or a resilient element or as a compliant element. In embodiments, the ring 90 encircles the halfshaft 40 and/or the centerline thereof. In embodiments, the ring 90 may be annular in shape or may have another shape, such as a non-circular shape, an undulating shape, or an irregular shape. In embodiments, the ring 90 may have a circular cross sectional shape or another cross sectional shape.

Figure 5:
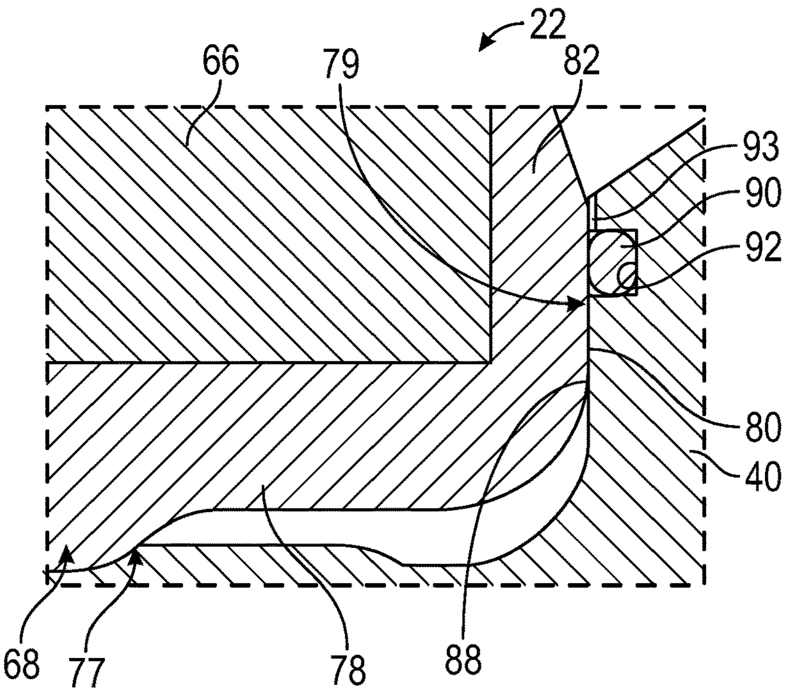
FIG. 5 is a sectional, fragmentary, schematic illustration of a noise suppression system area of the driveline of the vehicle of FIG. 1, in accordance with various embodiments.

Referring to FIG. 5, the interface area between the wall 82 and the halfshaft 40 at the surface 88 is illustrated. A groove 92 is formed in at least one of the surface 88 and/or the wall 82. In this embodiment, the groove 92 is formed in the halfshaft 40 at the surface 88. The groove 92 contains a ring 90. Adhesive may be used to retain the ring 90 in the groove 92. The groove 92 and the ring 90 are located closer to the outer diameter of the wall 82 than to its inner diameter to maximize the area of the interface that is bounded by the ring 90 to optimize the prevention of noise transmission.

The ring 90 is annular in shape and is sized to be compressed between the wall 82 and the surface 88 when the nut 84 is torqued. The resilient element/ring 90 is made of a material that is compressible and/or deformable or is otherwise compliant and that is selected for the application's environment with a sufficient toughness and temperature compatibility. For example, the ring 90 has a physical strength and the ability to retain its properties after long term exposure to heat, lubricants and forces. For example, a material that is able to withstand 80 degrees Celsius with excursions to 130 degrees Celsius may be selected. An example is a rubber-like material such as a hydrogenated nitrile butadiene rubber material, although other materials are contemplated.

Prior to torquing the fastener/nut 84, the resilient element/ring 90 extends out of the groove 92. When the nut 84 is torqued, the ring 90 moves into the groove 92 and metal-to-metal contact is established between the wall 82 and the surface 88 of the halfshaft 40. A gap 93 may be provided between the wall 82 and the halfshaft 40 at the surface 88 radially outward from the ring 90. The gap 93 provides space between the wall 82 and the surface 88 in the area radially outside the ring 90, which isn't provided with the benefits of the ring 90. In some embodiments, a washer (not shown) may be added between the wall 82 and the surface 88/ring 90.

Figure 6:
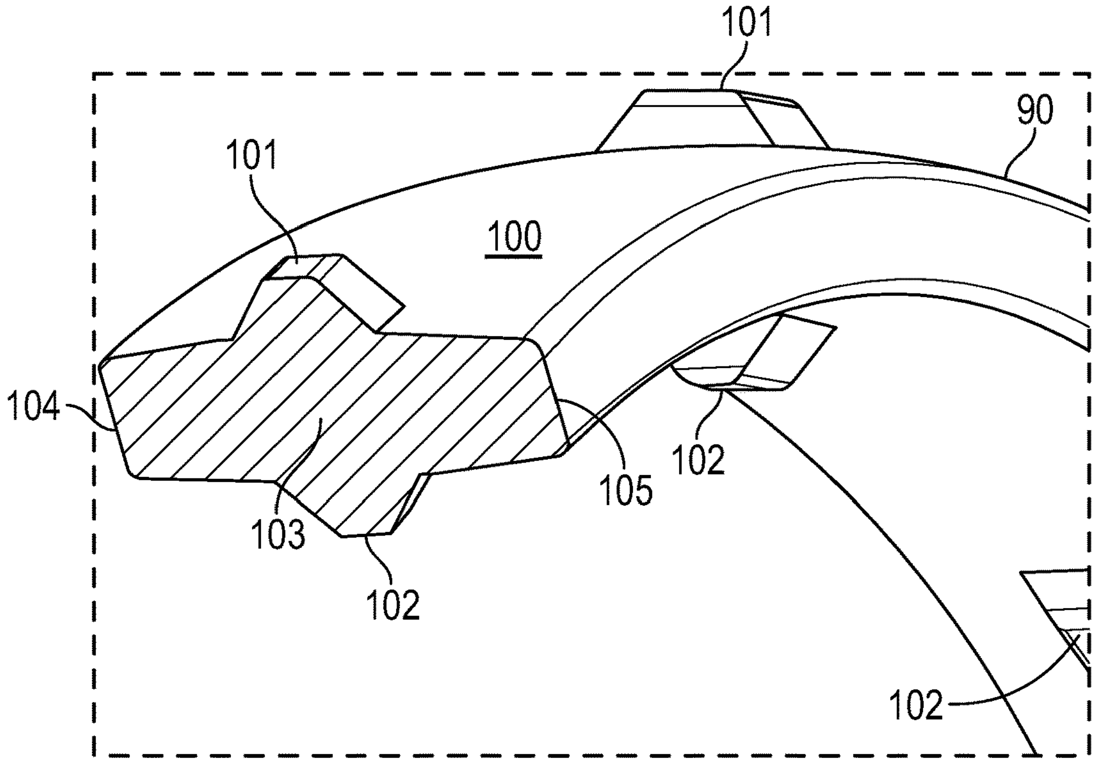
FIG. 6 is a fragmentary, sectional, perspective illustration of the noise suppression system's resilient element for the driveline of the vehicle of FIG. 1, in accordance with various embodiments.

In a number of embodiments, to optimize the foregoing features, the ring 90 may have a configuration as shown in FIG. 6, to which reference is directed. The ring 90 has a body 100 that is generally annular in shape. In this embodiment, the ring 90, and specifically the body 100, has a cross sectional shape that has a thickness larger in the axial direction than in the radial direction. The ring 90, in this embodiment, has projections 101 that project radially outward from the outer diameter of the body 100 and projections 102 that project radially inward from inner diameter the body 100. The projections 101 are spaced from each other and are disposed around the outer diameter of the body 100. The projections 102 are spaced from one another and are disposed around the inner diameter of the body 100. The cross section of the body 100 is tapered down in size in the axial direction both ways from its center 103 to the outboard side 104 and to the inboard side 105. The inboard side 105 is configured for insertion into the groove 92 and the projections 101, 102 engage the sides of the groove 92 acting as grippers that hold the ring 90 in position within the groove 92 during handling. During assembly, the ring 90 is inserted into the groove 92 with the outboard side 104 projecting out of the groove 92 outward beyond the surface 88. After the wheel hub and bearing assembly 64 is positioned and as the nut 84 is torqued, force is applied to the outboard side 104 by the wheel hub and bearing assembly 64 with the wall 82 compressing the ring 90 into the groove 92. This forces the inboard side 105 against the halfshaft 40 within the groove 92 ensuring secure contact on both sides. The cross section of the ring 90 may deform under the compression so that the material of the resilient ring 90 fills the groove 92, and provides tight contact at the interface, including within a range of processing/tolerance variations of the interfacing components.

Inclusion of the ring 90 provides a number of benefits. The presence of the ring 90 changes the acoustic properties of the interfacing elements, such as by changing the natural frequency. In embodiments, the ring 90 may provide damping of vibrations. Also adding the ring 90 changes how energy is radiated providing attenuation, especially at higher frequency ranges where sound may be undesirable. In addition to changing the vibrations before they occur, the ring 90 may block sound from emanating/radiating out of the interface acting as a type of barrier. In addition, the ring 90 seals the interface from outside elements preventing liquid and other corrosive elements form entering the interface between the wall 82 and the halfshaft 40 and from entering the interface between the hub body 78 and the splined shaft 50, avoiding noise generation.

In addition to inclusion of the ring 90 in the noise suppression system 22, torque on the nut 84 may be tailored to reduce/avoid noise as a part of methods for the noise suppression system 22. Torque for the fastening together of the wheel hub and bearing assembly 64 and the halfshaft 40 is, without use of the current disclosure, set a level (conventional torque value) that is maximized for retention purposes and is below an upper threshold. The upper threshold is a torque value that would compress the bearing assembly 66 to a point of distortion/damage. Accordingly, torque is conventionally maximized to the extent possible. In a number of embodiments of this disclosure, torque is selected (a selected torque value) above but approximately at, a lower threshold. The lower threshold is a torque value where the ring 90 is compressed into the groove 92 and the wall 82 contacts the surface 88, which has been discovered to provide optimized and secure noise suppression. It has been found that higher torque levels may decrease the noise suppression properties. In this case the torque is set at a selected torque value of approximately 20%-30% of the standard torque value. A non-limiting specific example includes a conventional torque value of 250 Nm and a selected torque value of 50 Nm. In this way, torque is reduced from what would be expected and optimizes the noise suppression properties.

With use of the ring 90, the torque on the nut 84 may be reduced to the selected torque value, which has been discovered to help eliminate undesirable sound. In embodiments, the torque is selected at a level that is at, or just above, where the wall 82 contacts (metal-to-metal) the surface 88, and the ring 90 is fully compressed into the groove 92. Testing may be conducted to determine the optimal torque on the fastener(s)/nut 84 to avoid undesirable sound generation.

Accordingly, noise suppression systems and methods are provided that address potential driveline 24 sounds. Undesirable sounds may be reduced or eliminated, with the benefits surviving over extended periods of time with repeated fatigue cycles. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A noise suppression system for a vehicle comprising:

a halfshaft configured for a driveline of the vehicle, the halfshaft having a surface;

a wheel hub and bearing assembly configured to be coupled with the halfshaft, the wheel hub and bearing assembly including a wall contacting the surface at an interface, wherein the wall faces in an axial direction and the surface of the halfshaft faces the wall, wherein at least one of the wall and the halfshaft defines a groove, the groove extending in an axial direction into the wall of the bearing assembly and/or into the surface of the halfshaft; and a ring compressed in the groove between the halfshaft and the wheel hub and bearing assembly, the ring contained in the groove, wherein the wall contacts the surface radially inward from the groove and a gap is defined between the surface and the wall radially outward from the groove, the gap extending from the groove to an outer periphery of the wall.

2. The noise suppression system of claim 1, wherein the ring comprises a body that is annular and a number of projections where a first set of the projections extend from the body radially outward and a second set of the projections extend from the body radially inward, wherein the projections are configured as grippers that hold the ring in position in the groove.

3. The noise suppression system of claim 2, wherein the body has a center and is tapered down in size in the axial direction both ways from the center including to an outboard side and to an inboard side.

4. The noise suppression system of claim 1, comprising a fastener configured to secure the wheel hub and bearing assembly to the halfshaft, wherein the fastener is torqued to a selected torque value that optimizes noise suppression.

5. The noise suppression system of claim 4, wherein the selected torque value is selected so that the wall contacts the surface and compresses the ring fully into the groove.

6. The noise suppression system of claim 4, wherein the fastener is torqued to a selected torque value for noise suppression, wherein the selected torque value is approximately twenty percent to thirty percent of a conventional torque valve of the fastener required for retention when the ring is not included.

7. The noise suppression system of claim 1, comprising a splined shaft on the halfshaft, wherein the ring is configured to seal the interface and the splined shaft.

8. The noise suppression system of claim 1, wherein the surface of the halfshaft is disposed normal to a centerline of the halfshaft.

9. The noise suppression system of claim 1, wherein the wheel hub and bearing assembly comprises a hub assembly with a hub body and a bearing assembly disposed around the hub body, wherein the wall is disposed at an inboard end of the hub body where the inboard end is located inboard relative to the vehicle.

10. The noise suppression system of claim 1, wherein the ring has a body with a cross sectional shape that tapers in an axial direction where the body has a center and is tapered down in size in the axial direction both ways from the center including to an outboard side and to an inboard side.

11. A method of noise suppression for a vehicle comprising:

constructing a halfshaft configured for a driveline of the vehicle, and providing the halfshaft with a surface;

coupling a wheel hub and bearing assembly with the halfshaft, the wheel hub and bearing assembly including a wall contacting the surface at an interface with the wall facing in an axial direction and the surface of the halfshaft facing the wall;

forming a groove in at least one of the wall and the halfshaft, the groove extending in an axial direction into the wall of the bearing assembly and/or into the surface of the halfshaft;

compressing a ring in the groove between the halfshaft and the wheel hub and bearing assembly with the ring contained in the groove; and contacting the wall with the surface radially inward from the groove and defining a gap between the surface and the wall radially outward from the groove, the gap extending from the groove to an outer periphery of the wall.

12. The method of claim 11, comprising forming the ring with a body that is annular and a number of projections where a first set of the projections extend from the body radially outward and a second set of the projections extend from the body radially inward, wherein the projections are configured as grippers that hold the ring in position in the groove.

13. The method of claim 12, comprising forming the body to have a center and to be tapered down in size in the axial direction both ways from the center including to an outboard side and to an inboard side.

14. The method of claim 11, comprising securing, by a fastener, the wheel hub and bearing assembly to the halfshaft; and torquing the fastener to a selected torque value that optimizes noise suppression.

15. The method of claim 14, comprising selecting the selected torque value so that the wall contacts the surface and compresses the ring fully into the groove.

16. The method of claim 14, comprising:

determining a conventional torque of the fastener without including the ring;

determining a selected torque value for noise suppression with the ring; and torquing the fastener to the selected torque value wherein the selected torque value is approximately twenty percent to thirty percent of the conventional torque valve to optimize the noise suppression.

17. The method of claim 11, comprising forming a splined shaft on the halfshaft; and sealing, by the ring, the interface and the splined shaft.

18. The method of claim 11, comprising forming the surface of the halfshaft to be disposed normal to a centerline of the halfshaft.

19. The method of claim 11, comprising:

including, in the wheel hub and bearing assembly, a hub assembly with a hub body and a bearing assembly disposed around the hub body; and forming the wall at an inboard end of the hub body where the inboard end is located inboard relative to the vehicle.

20. A noise suppression system for a vehicle comprising:

a driveline of the vehicle that includes a halfshaft, the halfshaft having a surface defining an annular shape around the halfshaft;

a wheel hub and bearing assembly coupled with the halfshaft, the wheel hub and bearing assembly including a hub body having a wall contacting the surface at an interface, wherein the wall faces in an axial direction and the surface of the halfshaft faces the wall, wherein at least one of the wall and the surface defines a groove, the groove extending in an axial direction into the wall of the bearing assembly and/or into the surface of the halfshaft;

a fastener configured to retain the wheel hub and bearing assembly to the halfshaft; and a compliant ring compressed, by a torquing of the fastener, in the groove between the halfshaft and the wheel hub and bearing assembly, with the ring contained in the groove, wherein the wall contacts the surface radially inward from the groove and a gap is defined between the surface and the wall radially outward from the groove, the gap extending from the groove to an outer periphery of the wall.

* * * * *